(12) United States Patent
Doerrer et al.

(10) Patent No.: US 10,538,439 B2
(45) Date of Patent: Jan. 21, 2020

(54) METHOD AND COMPOSITION FOR REDUCING NITRATES, NITRITES, AND/OR HYDROXYLAMINE IN WATER USING A HOMOGENEOUS REDUCED COPPER TETRA-SUBSTITUTED FLUORINATED PINACOLATE LIGAND CATALYST COMPLEX

(71) Applicant: Trustees of Boston University, Boston, MA (US)

(72) Inventors: Linda H. Doerrer, Cambridge, MA (US); Steven F. Hannigan, Boston, MA (US); Laleh Tahsini, Stillwater, OK (US); Christopher M. Kotyk, Acton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 15/545,088

(22) PCT Filed: Jan. 29, 2016

(86) PCT No.: PCT/US2016/015571
§ 371 (c)(1),
(2) Date: Jul. 20, 2017

(87) PCT Pub. No.: WO2016/123443
PCT Pub. Date: Aug. 4, 2016

(65) Prior Publication Data
US 2018/0009685 A1   Jan. 11, 2018

Related U.S. Application Data

(60) Provisional application No. 62/109,153, filed on Jan. 29, 2015.

(51) Int. Cl.
*C02F 1/70* (2006.01)
*B01J 31/16* (2006.01)
(Continued)

(52) U.S. Cl.
CPC ............ *C02F 1/70* (2013.01); *B01J 31/1625* (2013.01); *B01J 31/1633* (2013.01);
(Continued)

(58) Field of Classification Search
None
See application file for complete search history.

(56) References Cited

U.S. PATENT DOCUMENTS 5,306,400 A   4/1994 Bradbury et al.
5,614,078 A   3/1997 Lubin et al.
(Continued)

FOREIGN PATENT DOCUMENTS

WO   2012110841 A1   8/2012

OTHER PUBLICATIONS

Written Opinion of the International Searching Authority, dated Mar. 31, 2016 in International Application No. PCT/US2016/015571, seven (7) pages (unnumbered).
(Continued)

*Primary Examiner* — Bradley R Spies
(74) *Attorney, Agent, or Firm* — Iandiorio Teska & Coleman, LLP

(57) ABSTRACT

A method for reducing nitrates, nitrites, and/or hydroxylamine in water using a homogeneous reduced copper tetra-substituted fluorinated pinacolate ligand catalyst complex. The method includes dissolving a copper(II) tetra-substituted fluorinated pinacolate ligand pre-catalyst complex in water having an excess amount of nitrates, nitrites, and/or hydroxylamine therein. The dissolved copper(II) tetra-substituted fluorinated pinacolate ligand pre-catalyst complex in
(Continued)

the water is subjected to electrochemical reduction to form a homogeneous reduced copper tetra-substituted fluorinated pinacolate ligand catalyst complex. The homogeneous reduced copper tetra-substituted fluorinated pinacolate ligand catalyst complex reduces the nitrates, nitrites, and/or hydroxylamine in the water to compounds with nitrogen in a lower oxidation state with the homogeneous reduced copper tetra-substituted fluorinated pinacolate ligand catalyst complex.

16 Claims, 17 Drawing Sheets

(51) Int. Cl.
| | | |
|---|---|---|
| | B01J 31/22 | (2006.01) |
| | B01J 37/34 | (2006.01) |
| | C02F 1/467 | (2006.01) |
| | C02F 101/16 | (2006.01) |
| | C02F 103/06 | (2006.01) |

(52) U.S. Cl.
CPC ........... B01J 31/223 (2013.01); B01J 37/348 (2013.01); C02F 1/4676 (2013.01); B01J 2231/70 (2013.01); B01J 2531/16 (2013.01); C02F 2101/163 (2013.01); C02F 2101/166 (2013.01); C02F 2103/06 (2013.01)

(56) References Cited

U.S. PATENT DOCUMENTS

| | | | |
|---|---|---|---|
| 6,030,520 A * | 2/2000 | Dziewinski | B01D 53/54 205/771 |
| 6,436,275 B1 | 8/2002 | Dziewinski et al. | |
| 8,652,682 B2 | 2/2014 | Ihara et al. | |
| 2002/0114961 A1 * | 8/2002 | Harrup | B01J 45/00 428/448 |
| 2008/0138714 A1 | 6/2008 | Ihara et al. | |
| 2008/0138715 A1 | 6/2008 | Ihara et al. | |
| 2012/0270800 A1 | 10/2012 | Verdine et al. | |
| 2012/0292197 A1 | 11/2012 | Albrecht et al. | |
| 2014/0183054 A1 | 7/2014 | Legzdins | |

OTHER PUBLICATIONS

Tahsini et al., "Structural and Electronic Properties of Old and New $A_2[M(pin^F)_2]$ complexes", Inorganic Chemistry, vol. 52, Nov. 21, 2013, pp. 14050-14063.

M. Allan, C.J. Willis, "Fully Fluorinated Alkoxides. III. Perfluoropinacol, a Useful Bidentrate Ligand", Journal of American Chemical Society, 90:19, Sep. 11, 1968, (two (2) pages).

Granger, J., Sigman, D.M., Removal of nitrite with sulfamic acid for nitrate N and O isotope analysis with the denitrifier method, Rapid Commun. Mass. Spectrom., Dec. 2009, 23(23): 3753-62, (two (2) pages.

Duca et al., "Powering denitrification: the perspectives of electrocatalytic nitrate reduction", The Royal Society of Chemistry 2012, Energy Environ. Sci., 5, pp. 9726-9742.

Wyatt et al., "Ocean acidification foils chemical signals", ACS, Science, vol. 346, Oct. 10, 2014, p. 176.

Li et al., "Electrocatalytic Reduction of Nitrate in Sodium Hydroxide Solution in the Presence of Low-Valent Cobalt-Cyclam Species", Inorg. Chem., 1989, 28, pp. 863-868.

Yang et al., "pH dependence of the electroreduction of nitrate on Rh and Pt polycrystalline electrodes", ChemComm, The Royal Society of Chemistry, 2014, 50, pp. 2148-2151.

* cited by examiner

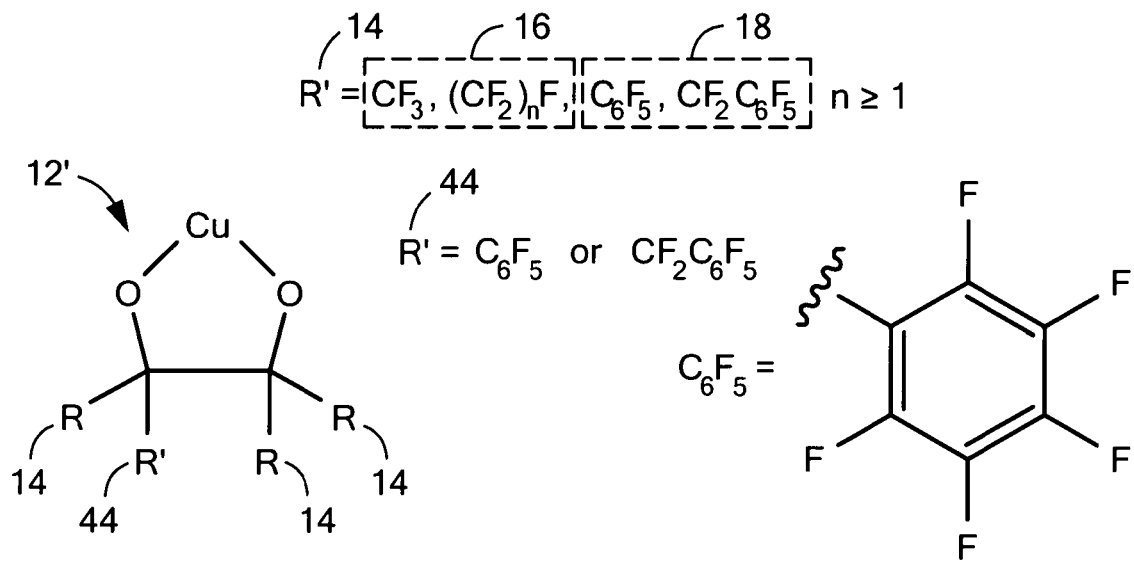
*FIG. 8*
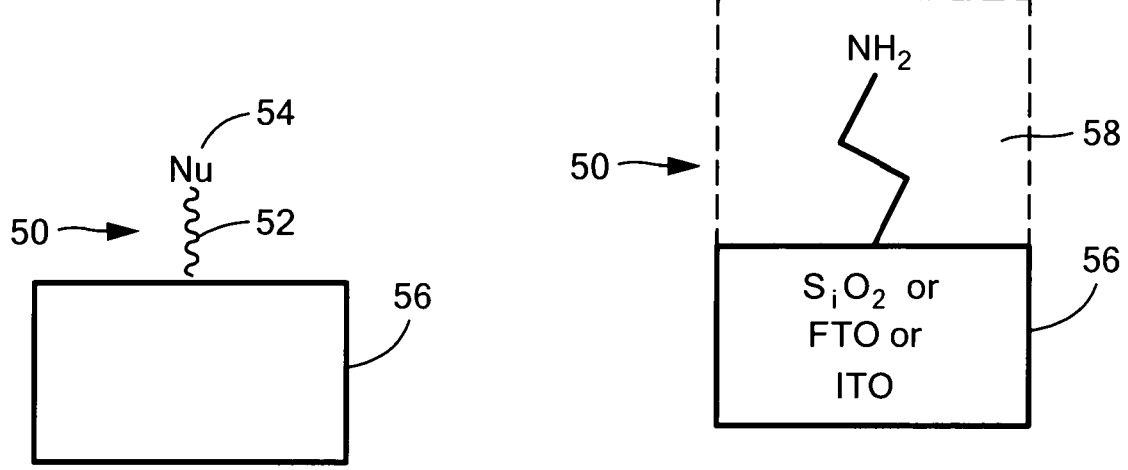
*FIG. 9*
*FIG. 10*

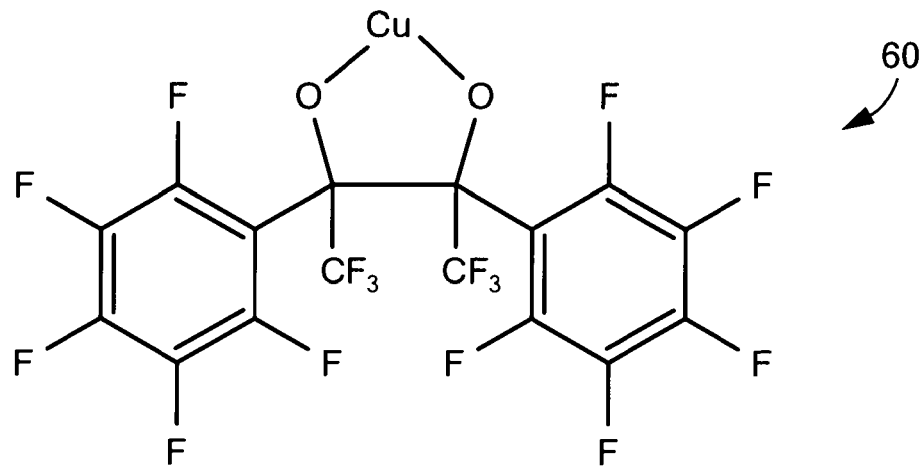
FIG. 11  [Cu(Ar₂pinF)]²⁻
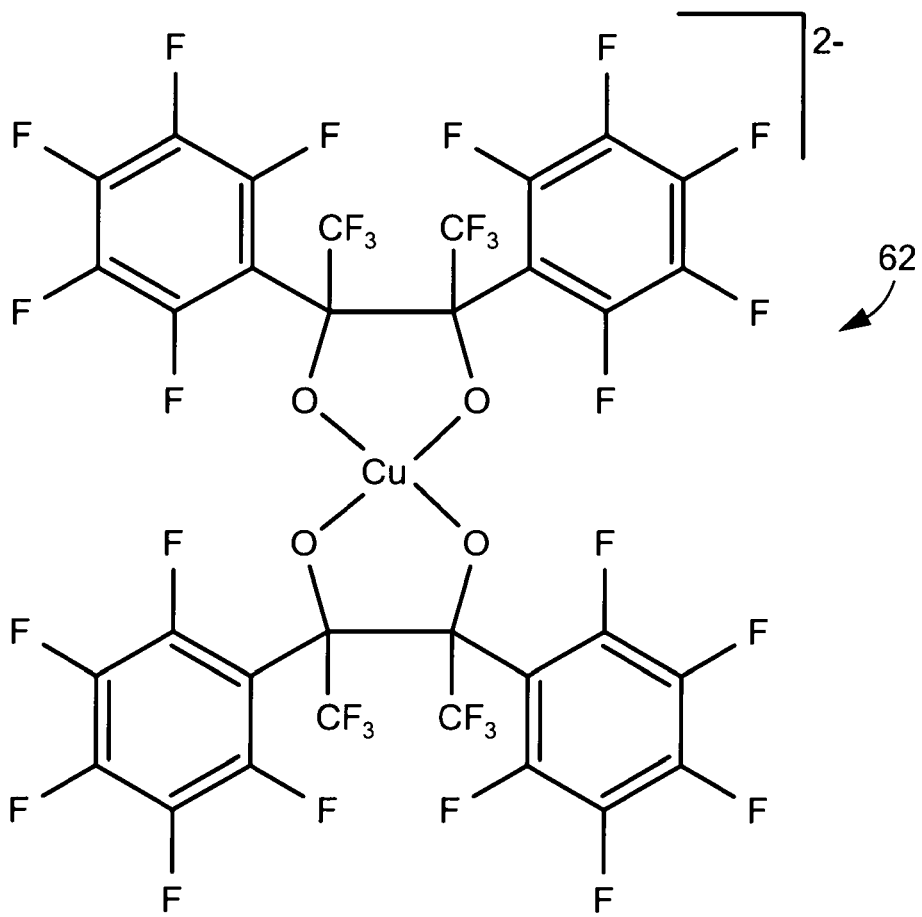
FIG. 12  [Cu(Ar₂pinF)₂]²⁻

METHOD AND COMPOSITION FOR REDUCING NITRATES, NITRITES, AND/OR HYDROXYLAMINE IN WATER USING A HOMOGENEOUS REDUCED COPPER TETRA-SUBSTITUTED FLUORINATED PINACOLATE LIGAND CATALYST COMPLEX

RELATED APPLICATIONS

This application claims benefit of and priority to U.S. Provisional Application Ser. No. 62/109,153, filed Jan. 29, 2015, under 35 U.S.C. §§ 119, 120, 363, 365, and 37 C.F.R. § 1.55 and § 1.78 and is incorporated herein by this reference.

GOVERNMENT RIGHTS

This invention was made with Government support under Contract No. DE-FG02-11ER16253 awarded by the Department of Energy. The Government has certain rights in the invention.

FIELD OF THE INVENTION

This invention relates to a method and composition for reducing nitrates, nitrites and/or hydroxylamine in water using a homogeneous reduced copper tetra-substituted fluorinated pinacolate ligand catalyst complex.

BACKGROUND OF THE INVENTION

Nitrates and nitrites are common and abundant components found in many fertilizers. As a result, the nitrates and nitrites may leach into ground water and eventually water bodies, such as lakes, rivers, and municipal water supplies. Depending on what happens to the nitrates and/or nitrites along the way to the water, nitrogen rich hydroxylamines may also be produced. The result is that nitrates, nitrites and/or hydroxylamines may be found in unnaturally high concentrations in fresh water bodies across the world. This may cause harmful algal blooms to proliferate and create "dead zones" because of the deoxygenation of the water. These ecologic "dead zones" with low or zero-oxygen ($O_2$ gas) environments result in loss or abandonment of aquatic life in freshwater resources.

Conventional techniques for removal of nitrates and/or nitrites from groundwater may include membrane separation, ion exchange, and biological denitrification. Membrane separation is an expensive technique that uses a semipermeable membrane to separate nitrate from groundwater. Conventional ion exchange techniques exchange nitrate for other ions such as chloride, but generate nitrate-containing waste. Biological denitrification uses microorganisms to reduce nitrates and nitrites to nitrogen. The problem with this process is a wide variation of nitrate reduction selectivity and the potential development of pathogenic bacteria in water.

The conventional techniques for removal of nitrates and nitrites from water discussed above all have significant issues when used on large scales. One ideal option is to reduce nitrates, nitrates and/or hydroxylamines in water to other non-harmful nitrogen-containing products such as nitrogen gas.

BRIEF SUMMARY OF THE INVENTION

In one aspect, a method for reducing nitrates, nitrites, and/or hydroxylamine in water using a homogeneous reduced copper tetra-substituted fluorinated pinacolate ligand catalyst complex is featured. The method includes dissolving a copper(II) tetra-substituted fluorinated pinacolate ligand pre-catalyst complex in water having an excess amount of nitrates, nitrites, and/or hydroxylamine therein. The dissolved copper(II) tetra-substituted fluorinate pinacolate ligand pre-catalyst complex in the water is subjected to electrochemical reduction to form a homogeneous reduced copper tetra-substituted fluorinated pinacolate ligand catalyst complex. The homogeneous reduced copper tetra-substituted fluorinated pinacolate ligand catalyst complex reduces the nitrates, nitrites, and/or hydroxylamine in the water to compounds with nitrogen in a lower oxidation state with the homogeneous reduced copper tetra-substituted fluorinated pinacolate ligand catalyst complex.

In one embodiment, the copper(II) tetra-substituted fluorinated pinacolate ligand pre-catalyst complex may include substituents configured as fluorinated aryl groups or fluorinated alkyl groups. The copper(II) tetra-substituted fluorinated pinacolate ligand pre-catalyst complex may include at least one fluorinated aryl group and a remainder of groups including fluorinated aryl groups or fluorinated alkyl groups. The method may include providing a nucleophilic tether including a hydrocarbon linker and a nucleophilic group configured to couple the homogeneous reduced copper tetra-substituted fluorinated pinacolate ligand catalyst complex to a surface with the copper(II) tetra-substituted fluorinated pinacolate ligand pre-catalyst complex including the at least one fluorinated aryl group to a surface. The nucleophilic tether may include an alkyl chain with nucleophilic group. The nucleophilic tether may include propyl amino. The surface may include one or more of: silicon dioxide ($SiO_2$), fluorinated tin oxide (FTO), and indium-doped tin oxide (ITO). The homogeneous copper(II) tetra-substituted fluorinated pinacolate ligand pre-catalyst complex may include copper(II) mono{di(pentafluorophenyl)di(trifluromethyl)} pinacolate. The copper(II) tetra-substituted fluorinated pinacolate ligand pre-catalyst complex may include copper(II) bis{di(pentaflurophenyl)di(trifluromethyl)} pinacolate. The copper(II) tetra substituted fluorinated pinacolate ligand pre-catalyst complex may include copper(II) bis(perfluoropinacolate). The method may further include providing a buffer to control the pH of the water and the homogeneous reduced copper tetra-substituted fluorinated pinacolate ligand catalyst complex to a pH in the range of about 8 to 11. The electrochemical reduction may include applying an electrical potential between an anode and a cathode placed in the water having the copper(II) tetra-substituted fluorinated pinacolate ligand pre-catalyst complex therein at a potential in the range of about −0.95 V to about −1.20 V. The surface may include the surface of a flow tube configured to receive a flow of the water having an excess amount of the nitrates, nitrites, and/or hydroxylamine. The homogeneous reduced copper tetra-substituted fluorinated pinacolate ligand catalyst complex may include at least one fluorinated aryl coupled to the surface of the flow tube which is thereby configured to reduce the nitrates, nitrites, and and/or hydroxylamine in the flow of the water to the compounds with nitrogen in a lower oxidation state. The homogeneous reduced copper tetra-substituted fluorinated pinacolate ligand catalyst complex may include at least one fluorinated aryl coupled to the surface of the flow tube as configured to remove the nitrates, nitrites, and and/or hydroxylamine in the flow of the water to the compounds with nitrogen in a lower-oxidation state. The water having excess nitrates, nitrites, and/or hydroxylamine therein may include water from a municipal water supply.

In another aspect, a method for tethering a tetra-substituted fluorinated pinacolate ligand to a surface is featured. The method includes providing a nucleophilic tether configured to couple to the surface. The nucleophilic tether includes a hydrocarbon linker and a nucleophilic group. The nucleophilic group reacts with a tetra-substituted fluorinated pinacol to bond the nucleophilic group to the tetra-substituted fluorinated pinacol and form a tethered tetra-substituted fluorinated pinacol. The tethered tetra-substituted fluorinated pinacol is deprotonated with a base and forms a tethered tetra-substituted fluorinated pinacolate. Copper is complexed to the tethered tetra-substituted fluorinated pinacolate to form a tethered copper tetra-substituted fluorinated pinacolate ligand pre-catalyst complex.

In one embodiment, the tetra-substituted fluorinated pinacol may include at least one fluorinated aryl group and a remainder of groups including fluorinated aryl groups or fluorinated alkyl groups. The tetra-substituted fluorinated pinacol may include di(pentaflurophenyl)di(trifluromethyl)} pinacol. The tethered copper tetra-substituted fluorinated pinacolate ligand catalyst complex may include at least one fluorinated aryl group and a remainder of groups including fluorinated aryl groups or fluorinated alkyl groups. The tethered homogeneous copper(II) tetra-substituted fluorinated pinacolate ligand pre-catalyst complex may be configured as copper(II) mono{di(pentaflurophenyl)di(trifluromethyl)} pinacolate ligand pre-catalyst complex. The tethered copper(II) tetra-substituted fluorinated pinacolate ligand pre-catalyst complex may be configured as copper(II) bis{di-pentaflurophenyl di-tri fluromethyl} pinacolate ligand pre-catalyst complex. The nucleophilic tether may include an alkyl chain with nucleophilic group. The nucleophilic tether may include propyl amino. The surface may include one or more of: silicon dioxide ($SiO_2$), fluorinated tin oxide (FTO), and indium doped tin oxide (ITO).

In another aspect, the copper(II) tetra-substituted fluorinated pinacolate ligand pre-catalyst complex for reducing nitrates, nitrites, and/or hydroxylamine in water may include a copper(II) tetra-substituted fluorinated pinacolate ligand pre-catalyst complex including at least one fluorinated aryl group and a remainder of groups include fluorinated aryl groups or fluorinated alkyl groups.

In one embodiment, the fluorinated aryl group may include a pentafluorophenyl group and the fluorinated alkyl groups may include trifluoromethyl. The copper(II) tetra-substituted fluorinated pinacolate ligand pre-catalyst complex may be configured as copper(II) mono{di(pentafluorophenyl)di(trifluromethyl)} pinacolate ligand pre-catalyst complex. The copper(II) tetra-substituted fluorinated pinacolate ligand pre-catalyst may be configured as copper(II) bis{di(pentaflurophenyl)di(trifluromethyl)} pinacolate ligand pre-catalyst complex.

In another aspect, a tetra-substituted fluorinated pinacolate ligand pre-catalyst complex tethered to a surface is featured including a nucleophilic tether including a hydrocarbon linker and a nucleophilic group coupled to the surface and a copper(II) tetra-substituted fluorinated pinacolate ligand pre-catalyst complex coupled to the nucleophilic tether.

In one embodiment, the copper(II) tetra-substituted fluorinated pinacolate ligand pre-catalyst complex may include at least one fluorinated aryl group and a remainder of groups including fluorinated aryl groups or fluorinated alkyl groups. The copper(II) tetra-substituted fluorinated pinacolate ligand pre-catalyst complex may be configured as copper(II) mono{di(pentafluorophenyl)di(trifluromethyl)} pinacolate ligand pre-catalyst complex. The copper(II) tetra-substituted fluorinated pinacolate ligand pre-catalyst complex may be configured as copper(II) bis{di-pentaflurophenyl di(trifluromethyl)} pinacolate. The nucleophilic tether may include an alkyl chain with a nucleophilic group. The hydrocarbon linker may include propyl amino. The surface may include one or more of: silicon dioxide ($SiO_2$), fluorinated tin oxide (FTO), and indium doped tin oxide (ITO).

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 8 is a chemical diagram of one example of a copper(II) tetra-substituted fluorinated pinacolate ligand pre-catalyst complex of another embodiment of this invention including at least one substituted fluorinated aryl group and the remainder of groups including fluorinated alkyl groups or fluorinated aryl groups;

FIG. 9 is a schematic block diagram showing one example of a nucleophilic tether configured to couple the homogeneous reduced copper tetra-substituted fluorinated pinacolate ligand catalyst complex including at least one fluorinated aryl group to a surface;

FIG. 10 is a schematic block diagram showing one example of the nucleophilic tether shown in FIG. 9;

FIG. 11 is a chemical diagram of one example of the copper(II) tetra-substituted fluorinated pinacolate ligand pre-catalyst complex shown in FIG. 8 configured as copper (II) mono{di(pentaflurophenyl)di(trifluromethyl)} pinacolate;

FIG. 12 is a chemical diagram showing another embodiment of the copper(II) tetra-substituted fluorinated pinacolate ligand pre-catalyst complex shown in FIG. 8 configured as copper(II) bis{di(pentaflurophenyl)di(trifluromethyl)} pinacolate ligand pre-catalyst complex;

DETAILED DESCRIPTION OF THE INVENTION

Figure 1:
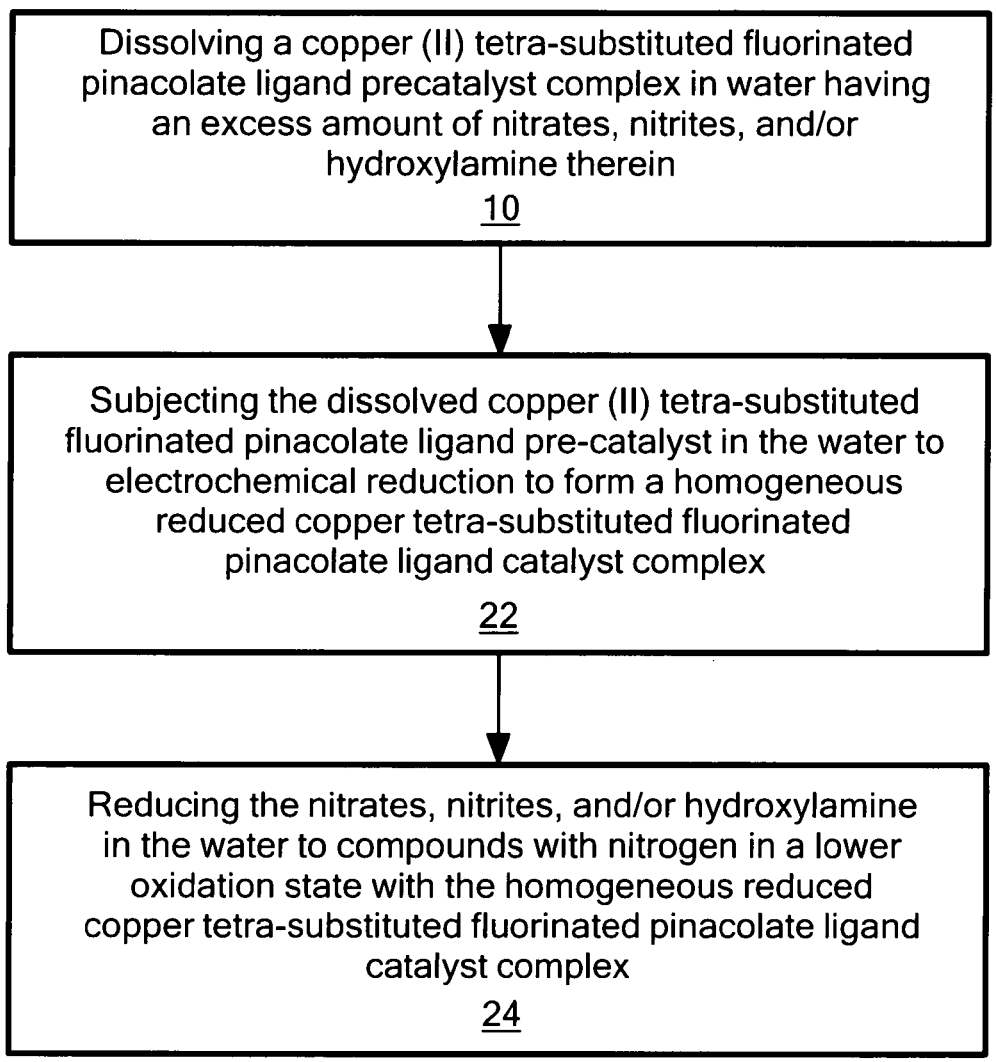
FIG. 1 is a flow chart showing one example of the primary steps of one embodiment of the method of reducing nitrates, nitrites, and/or hydroxylamine in water using a homogeneous reduced copper tetra-substituted fluorinated pinacolate ligand catalyst complex of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
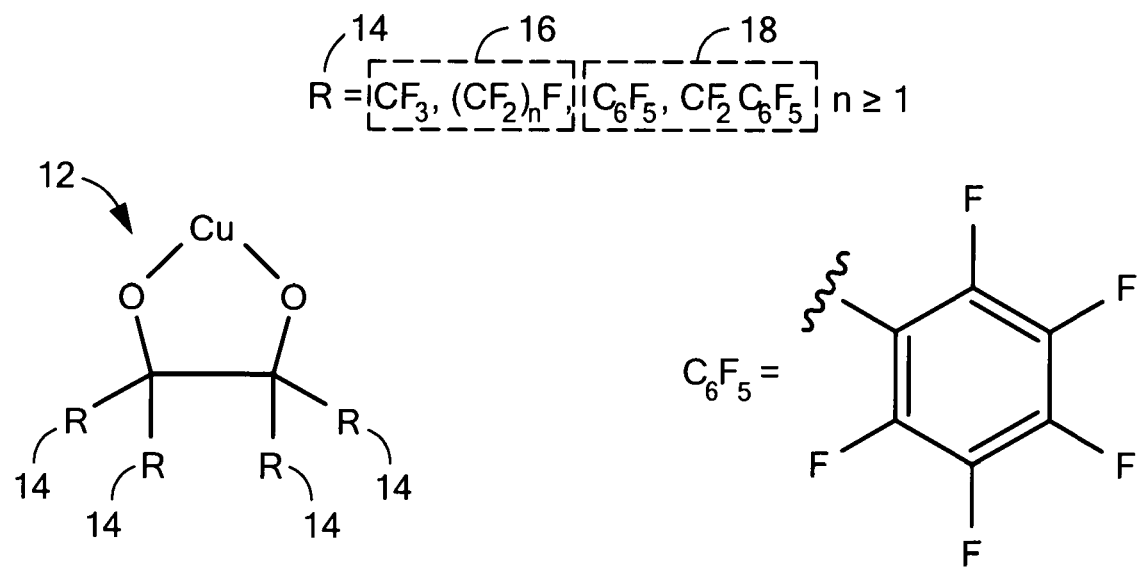
FIG. 2 is a chemical diagram of one example of a copper(II) tetra-substituted fluorinated pinacolate ligand pre-catalyst complex of FIG. 1 in which the substituents may be fluorinated alkyl groups and fluorinated aryl groups.

There is shown in FIG. 1 one example of the method for reducing nitrates, nitrites, and/or hydroxylamine in water using a homogeneous reduced copper tetra-substituted fluorinated pinacolate ligand catalyst complex of one embodiment of this invention. The method includes dissolving a copper(II) tetra-substituted fluorinated pinacolate ligand pre-catalyst complex in water having an excess amount of nitrates, nitrites, and/or hydroxylamine therein, step 10. In one example, copper(II) tetra-substituted fluorinated pinacolate ligand pre-catalyst complex 12, FIG. 2, may include substituents R-14 configured as fluorinated alkyl group 16, e.g., a tri-fluoromethyl ($CF_3$) group or a perfluoroalkyl ($CF_2)_nF$ group, where n≥1 or as fluorinated aryl group 18, e.g., a pentafluorophenyl ($C_6F_5$) group or a perfluorobenzyl ($CF_2C_6F_5$) group.

Figure 3:
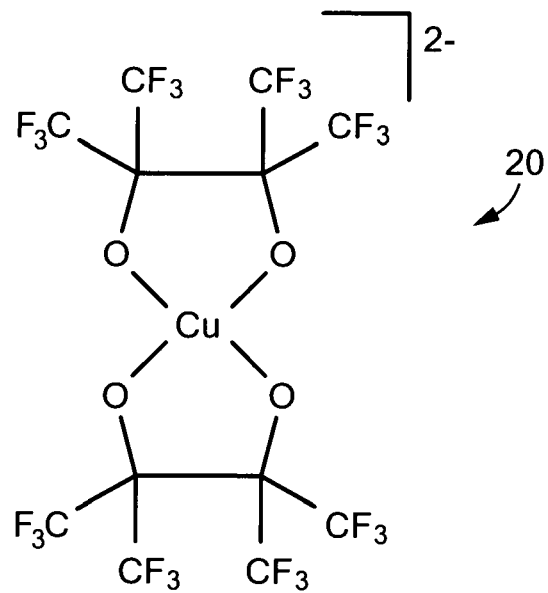
FIG. 3 is a chemical diagram of copper(II) tetra-substituted fluorinated pinacolate ligand pre-catalyst complex shown in FIGS. 1 and 2 configured as a Cu (II) bis (perfluoropinacolate) ligand pre-catalyst complex.
Figure 4:
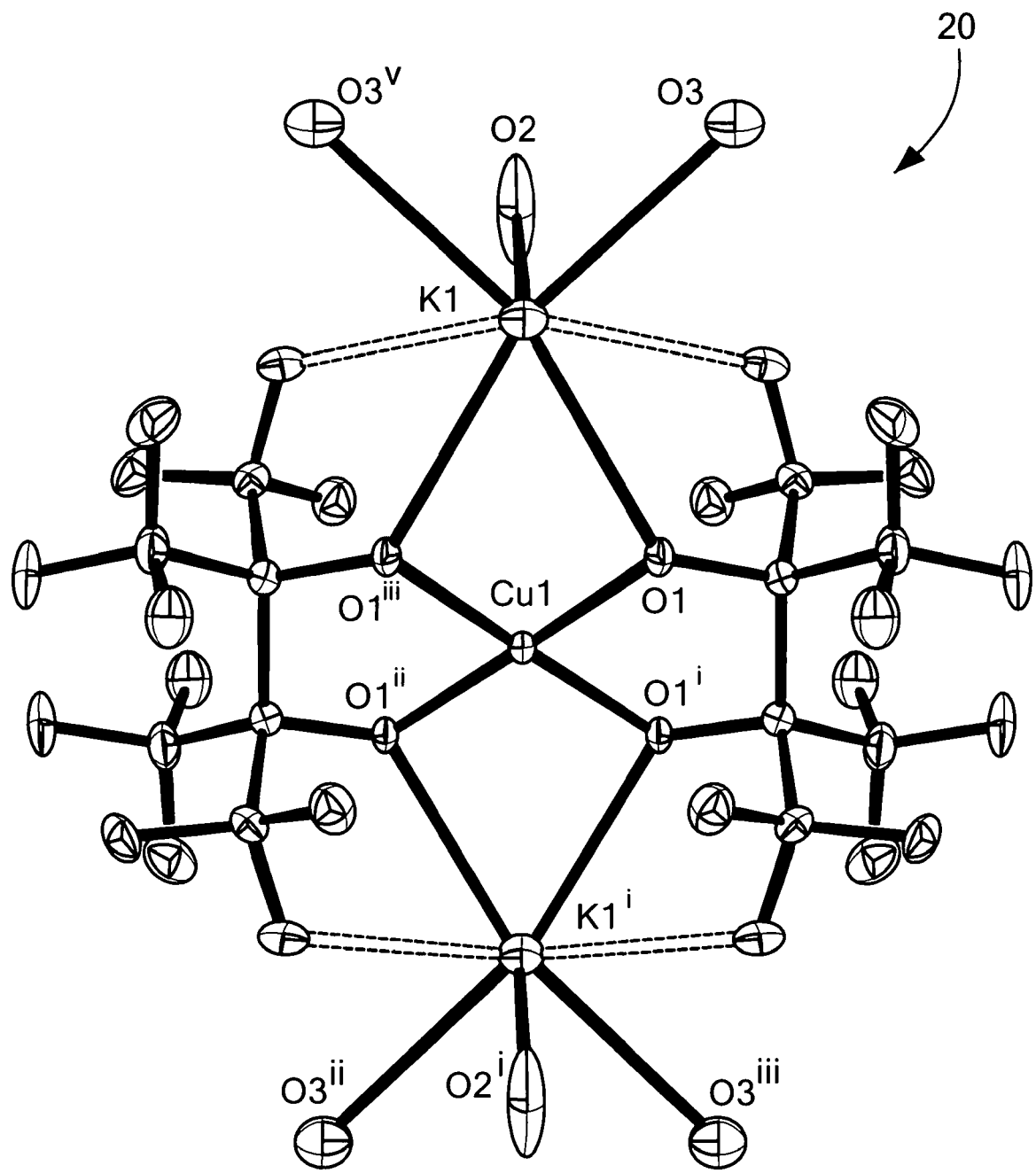
FIG. 4 is an Oak Ridge Thermal Ellipsoid Plot (ORTEP) of the Cu (II) bis(perfluoropinacolate) ligand pre-catalyst complex shown in FIG. 3.

In one example, copper(II) tetra-substituted fluorinated pinacolate ligand pre-catalyst complex 12 may be configured or substituted as Cu(II) bis(perfluoropinacolate) ligand pre-catalyst complex 20, FIG. 3. FIG. 4 shows an Oak Ridge Thermal Ellipsoid Plot (ORTEP) of Cu (II) bis(perfluoropinacolate) ligand pre-catalyst complex 20. In this example, copper (II) bis(perfluoropinacolate) ligand pre-catalyst complex 20, FIG. 3, also referred to herein as $[Cu(pinF)_2]$ or Cu-pinF, has 12 fluorine (F) atoms on it and zero hydrogen (H) atoms. In other examples, the copper (II) bis(fluoropinacolate) pre-catalyst ligand may have any formulation in which the total number of fluorine atoms and hydrogen atoms is 12, e.g., 10 F, 2H; 8F, 4H; and the like. Preferably, the Cu (II) bis(fluoropinacolate) ligand pre-catalyst complex is oxidation resistant.

In one example, copper (II) bis(perfluoropinacolate) ligand pre-catalyst complex may be formulated in accordance with the following example:

EXAMPLE $K_2[Cu(pin^F)_2]$, $6.4H_2O$. In air, $Cu(NO_3)_2.3H_2O$ (0.122 g, 0.501 mmol dissolved in 2 mL of $H_2O$) was added to $H_2pin^F$ (0.348 g, 1.01 mmol) dissolved in 3 mL of MeOH while stirring. Addition of an aqueous solution of KOH (0.080 g, 2.00 mmol) afforded a deep blue solution. The reaction mixture was allowed to stir for 1 h, and was then concentrated by heating at 50-60° C. Deep blue crystals were isolated after cooling down the solution to 5° C., and were washed further with a minimum amount of cold $H_2O$ and dried in air with a yield of 67% (0.295 g). Blue-colored crystals suitable for X-ray analysis were grown by slow evaporation of an aqueous solution. UV-vis ($CH_3CN$) ($\lambda_{max}$ ($\epsilon$, $cm^{-1}$ $M^{-1}$)): 195 (2960), 242 (6670), 646 (32); ($H_2O$) ($\lambda_{max}$ nm ($\epsilon$, $cm^{-1}$ $M^{-1}$)), 193 (7920), 241 (6150), 668 (22). Anal. Calcd. for $C_{12}H_4 CuF_{24}K_2O_6$: C, 17.12; H, 0.48; F, 54.16. Found: C, 16.86; H, 0.27; F, 53.09. (Fluorine analysis likely low due to incomplete combustion) μeff ($CD_3CN$)=1.71$\mu_B$.

The molecular structure of $[Cu(pin^F)_2]^2$, 20, FIG. 3, as well as the solid state X-ray structure with two potassium cations, FIG. 4, have been previously published, (See, e.g., Tahsini et.al, Inorganic Chemistry, 2013, 52, 14050), incorporated by reference herein. The synthesis of homogeneous Cu bis(perfluoropinacolate) pre-catalyst complex has been established and optimized and can be done in air and using water as a solvent. The homogeneous Cu bis(perfluoropinacolate) pre-catalyst complex can be synthesized on a gram scale and may also be scaled to larger quantities. Pure material can be isolated within twenty-four hours after the start of synthesis.

The solution containing the dissolved copper(II) tetra-substituted fluorinated pinacolate ligand pre-catalyst complex is then subjected to electrochemical reduction to form a homogeneous reduced copper tetra-substituted fluorinated pinacolate ligand catalyst complex, step 22, FIG. 1. In one example, the copper(II) tetra-substituted fluorinated pinacolate ligand pre-catalyst complex may include homogeneous reduced copper bis(perfluoropinacolate) ligand catalyst complex created from copper (II) bis(perfluoropinacolate) ligand pre-catalyst complex 20, FIG. 3. In other examples, homogeneous reduced copper tetra-substituted fluorinated pinacolate ligand catalyst complex may have any formulation in which the total number of fluorine atoms and hydrogen atoms is 12, e.g., 10 F, 2H; 8F, 4H, and the like. The homogeneous reduced copper tetra-substituted fluorinated pinacolate ligand catalyst complex has an oxidation state less than Cu (II), e.g., Cu(I), Cu(0), and the like.

The homogeneous reduced copper tetra-substituted fluorinated pinacolate ligand catalyst complex reduces the nitrates, nitrites, and/or hydroxylamine in the water to compounds with nitrogen in a lower oxidation state, step 24, FIG. 1, by transferring electrons from the homogeneous reduced copper tetra-substituted fluorinated pinacolate ligand catalyst complex to nitrates, nitrites, and/or hydroxylamine. For example, nitrates, e.g., $LiNO_3$, $NaNO_3$, $KNO_3$ (found in fertilizer), $Ca(NO_3)_2$ with a nitrogen oxidation state of +5 may be reduced to nitrites, e.g., $NaNO_2$ or $KNO_2$ having a nitrogen oxidation state of +3. The nitrites may then be reduced to nitric oxide (NO) gas with an oxidation state of +2 or preferably to nitrogen gas, $N_2(g)$, with a nitrogen oxidation state of 0. Hydroxylamine, $NH_2OH$, with a nitrogen oxidation state of −2 may be reduced to ammonia, $NH_3$, with a nitrogen oxidation state of −3.

Figure 5:
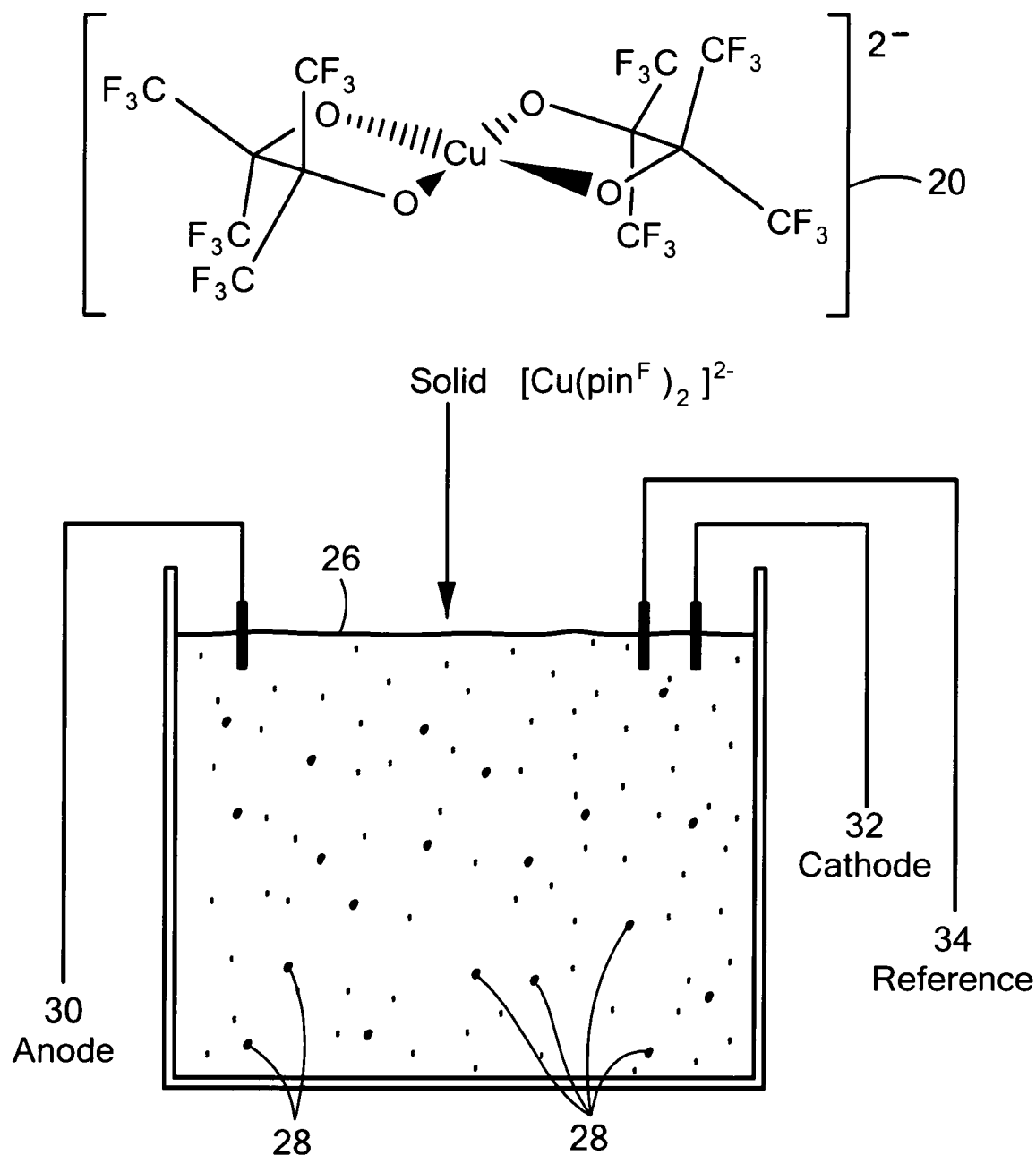
FIG. 5 is a schematic block diagram showing one example of the primary components which may be used by the method shown in FIG. 1.

FIG. 5 shows one example of the primary components which may be used for subjecting copper(II) tetra-substituted fluorinated pinacolate ligand pre-catalyst complex 20 to electrochemical reduction in accordance with the method shown in FIG. 1. In this example, Cu (II) bis(perfluoropinacolate) ligand pre-catalyst complex 20 in solid form is dissolved in water 26 having an excess amount of nitrates, nitrites, and/or hydroxylamines therein. The homogeneous reduced Cu bis(perfluoropinacolate) ligand catalyst complex is then formed, exemplary indicated at 28 in water 26. In one example, the method was performed in water 26 with a KCl supporting electrolyte and a $K_2pin^F$ buffer comprised of $H_2pin^F$ and KOH. Preferably, the buffer may be used to control the pH of the solution of water 26 and the homogeneous reduced copper tetra-substituted fluorinated pinacolate ligand catalyst complex in water 24, e.g., homogeneous reduced Cu bis(perfluoropinacolate) ligand catalyst complex indicated at 28, to a pH in the range of about 8-11, as nitrate reduction is observed in this range, close to the pH range of tap water (6.5-8.5). An electrical potential is applied between anode 30 and cathode 32 to subject copper(II) tetra-substituted fluorinated pinacolate ligand pre-catalyst complex in water 26 to electrochemical reduction to form the homogeneous reduced copper tetra-substituted fluorinated pinacolate ligand catalyst complex, e.g., homogeneous reduced Cu bis(perfluoropinacolate) ligand complex indicated at 28, as known by those skilled in the art. Reference electrode 34 is used for reference potential. In one example, a glassy carbon or graphite working electrode (cathode 32) may be used with a platinum wire as a counter electrode (anode 30). In one example, reference electrode 34 may be Ag/AgCl. Preferably the reducing potential to generate catalytic current provided at cathode 32 in the range of about −0.95 V to about −1.2 V, e.g., about −1.0 V when compared to the reference electrode 34. A voltage closer to zero means less energy is used by the method disclosed herein.

Figure 6:
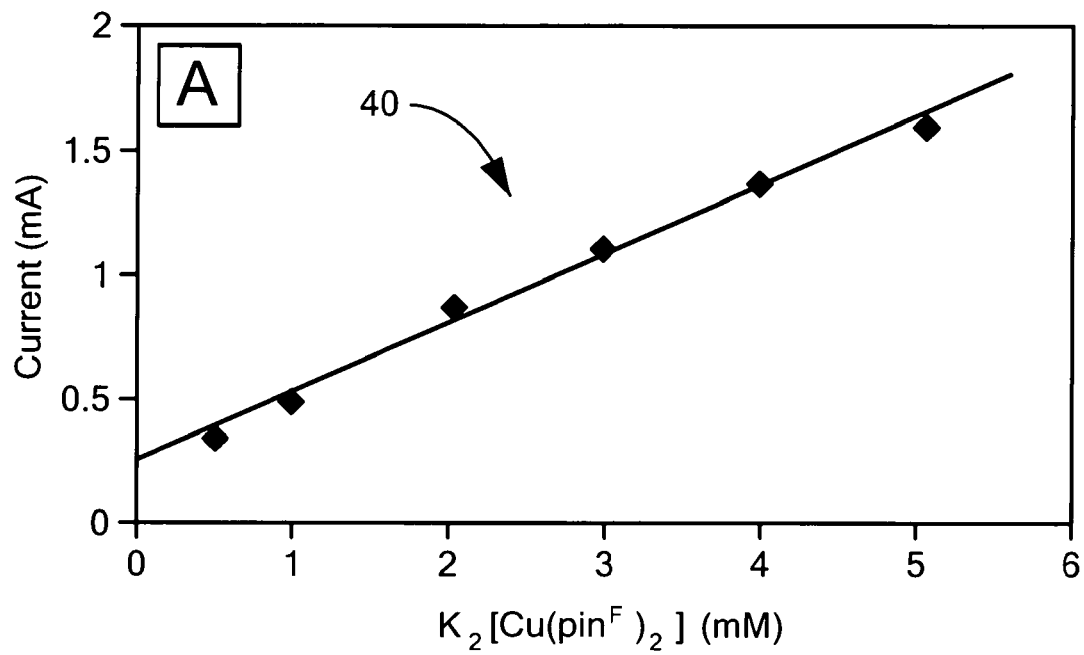
FIG. 6 is a plot showing an example of the cathodic current increasing as the concentration of the homogeneous copper bis(perfluoropinacolate) ligand pre-catalyst complex increases in accordance with the method shown in one or more of FIGS. 1-5.
Figure 7:
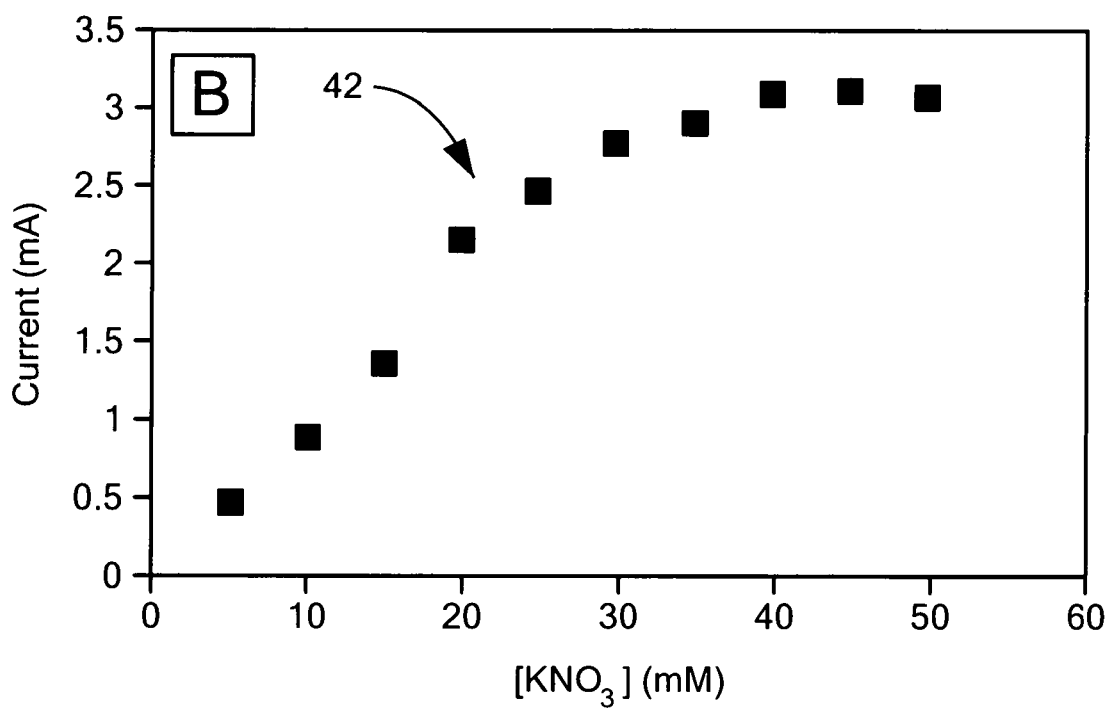
FIG. 7 is a plot showing one example of the cathodic current increasing as the concentration of nitrates increase in accordance with the method shown in one or more of FIGS. 1-5.

Graph 40, FIG. 6 shows one example of the increase in the observed catalytic current as the concentration of the homogeneous Cu bis(perfluoropinacolate) ligand pre-catalyst complex 20 is increased. Graph 42, FIG. 7, shows a strong correlation of the observed concentration of $NO_3^-$ and the catalytic current. In this example, the catalytic current increases proportional to the addition of $NO_3^-$ because the process is $NO_3^-$ dependent.

The result is a method for reducing nitrates, nitrites, and/or hydroxylamine in water using a homogeneous reduced copper tetra-substituted fluorinated pinacolate ligand catalyst complex of one or more embodiments of this invention that effectively and efficiently reduces nitrates, nitrites and/or hydroxylamines to compounds with nitrogen in a lower oxidation state. Thus, the method can reduce nitrates in water to nitrites which can then be reduced to presumed nitrogen gas to effectively and efficiently reduce and ultimately remove nitrates and/or nitrites from water. Hydroxylamines in water can also be reduced to ammonia.

The homogeneous reduced copper tetra-substituted fluorinated pinacolate ligand catalyst complex discussed above performs homogeneous catalysis, meaning that the reduction process is solution based and not a result of deposition onto the electrode. A homogeneous reduced copper tetra-substituted fluorinated pinacolate ligand catalyst complex is unique because it can reduce nitrates, nitrites and/or hydroxylamines in aqueous solution. The method for reducing nitrates, nitrites, and/or hydroxylamine in water using a homogeneous reduced copper tetra-substituted fluorinated pinacolate ligand catalyst complex performs the reduction at a lower potential, e.g., about −1.0V, when compared to conventional methods and is therefore a more efficient catalyst.

The inventors hereof realized that when the copper(II) tetra-substituted fluorinated pinacolate ligand pre-catalyst complex is configured as homogeneous reduced copper bis(fluoropincolate) ligand catalyst complex, it cannot easily be modified to put a tether on it for coupling it to a surface because of the hybridization of the carbon in the trifluoromethyl ($CF_3$) group. To overcome this problem, the method shown in FIG. 1 further includes providing a copper(II) tetra-substituted fluorinated pinacolate ligand pre-catalyst complex 12', FIG. 8, which includes at least one fluorinated aryl group R'-44, e.g., a pentafluorophenyl ($C_6F_5$) group or a perfluorobenzyl ($CF_2C_6F_5$) group and the remainder of groups R-14 including fluorinated alkyl groups 16, e.g., a tri-fluoromethyl ($CF_3$) group or a perfluoroalkyl ($CF_2)_nF$ group, where n≥1 or fluorinated aryl groups 18, e.g., pentafluorophenyl ($C_6F_5$) group or a perfluorobenzyl ($CF_2C_6F_5$) group. The method further includes providing nucleophilic tether 50, FIG. 9, which includes hydrocarbon linker 52 and nucleophilic group 54 configured to couple homogeneous reduced copper tetra-substituted fluorinated pincolate ligand catalyst complex to a surface, e.g., surface 56, with the copper(II) tetra-substituted fluorinated pinacolate ligand pre-catalyst complex 12', FIG. 8, which includes at least one fluorinated aryl group R'-44. In one example, nucleophilic tether 50, FIG. 9, includes an alkyl chain in a nucleophilic group as shown. In one design, nucleophilic tether 50, FIG. 10, may include propyl amino 58. Surface 56 may include one or more of silicon dioxide ($SiO_2$), fluorinated tin oxide (FTO) or indium doped tin oxide (ITO), as shown in FIG. 10, or similar type surface.

In one example, copper(II) tetra-substituted fluorinated pincolate ligand pre-catalyst complex 12', FIG. 8, may be configured as copper(II) mono{di(pentaflurophenyl)di(tri-flluromethyl)} pinacolate ligand pre-catalyst complex-60, FIG. 11. In other examples, copper(II) tetra-substituted fluorinated pinacolate ligand pre-catalyst complex-12', FIG.

8, may be configured as copper(II) bis{di(pentaflurophenyl) di(trifluromethyl)} pinacolate ligand pre-catalyst complex-62, FIG. 12.

Figure 13:
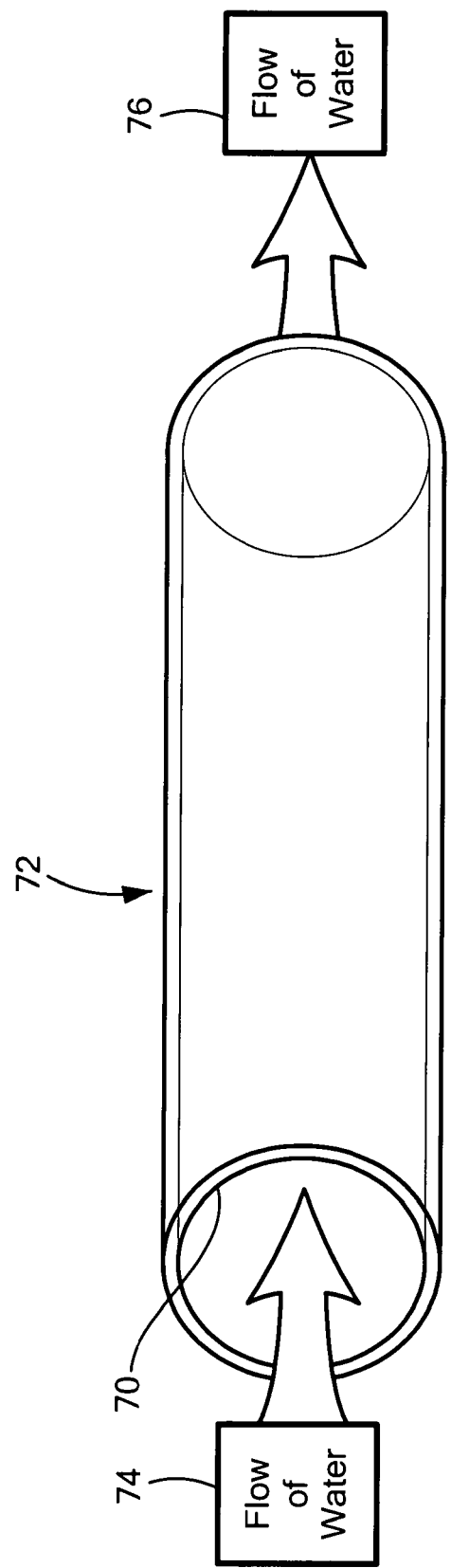
FIG. 13 is a schematic block diagram showing one example of a homogeneous reduced copper tetra-substituted fluorinated pinacolate ligand catalyst complex which may be coupled to the surface of the flow tube using the nucleophilic tether shown in FIGS. 9 and 10.

In one example, surface 56, FIGS. 9 and 10, may include the surface of a flow tube, e.g., surface 70, FIG. 13 of flow tube 72, configured to receive a flow of the water 74 having an excess amount of the nitrates, nitrites, and/or hydroxylamine therein. In this example, the homogeneous reduced copper tetra-substituted fluorinated pinacolate ligand catalyst complex derived from subjecting copper(II) tetra-substituted fluorinated pinacolate ligand pre-catalyst complex shown in FIG. 8, 11, or 12, subjected to electrochemical reduction discussed above is coupled to surface 70 of flow tube 72 and therefore is configured to reduce the nitrates, nitrites, and and/or hydroxylamine from flow of the water 74 to compounds with nitrogen in a lower oxidation state, as discussed above. The result is a flow of water 76 exiting flow tube 72 that may have nitrates, nitrites and/or hydroxylamines removed therefrom. In one example, flow of water 74 may be from a municipal water supply. Thus, the method for reducing nitrates, nitrites, and/or hydroxylamine in water using a homogeneous reduced copper tetra-substituted fluorinated pinacolate ligand catalyst complex may be used as an effective water treatment for removing nitrates and nitrites from water supplies, such as a municipal water supply.

Figure 14:
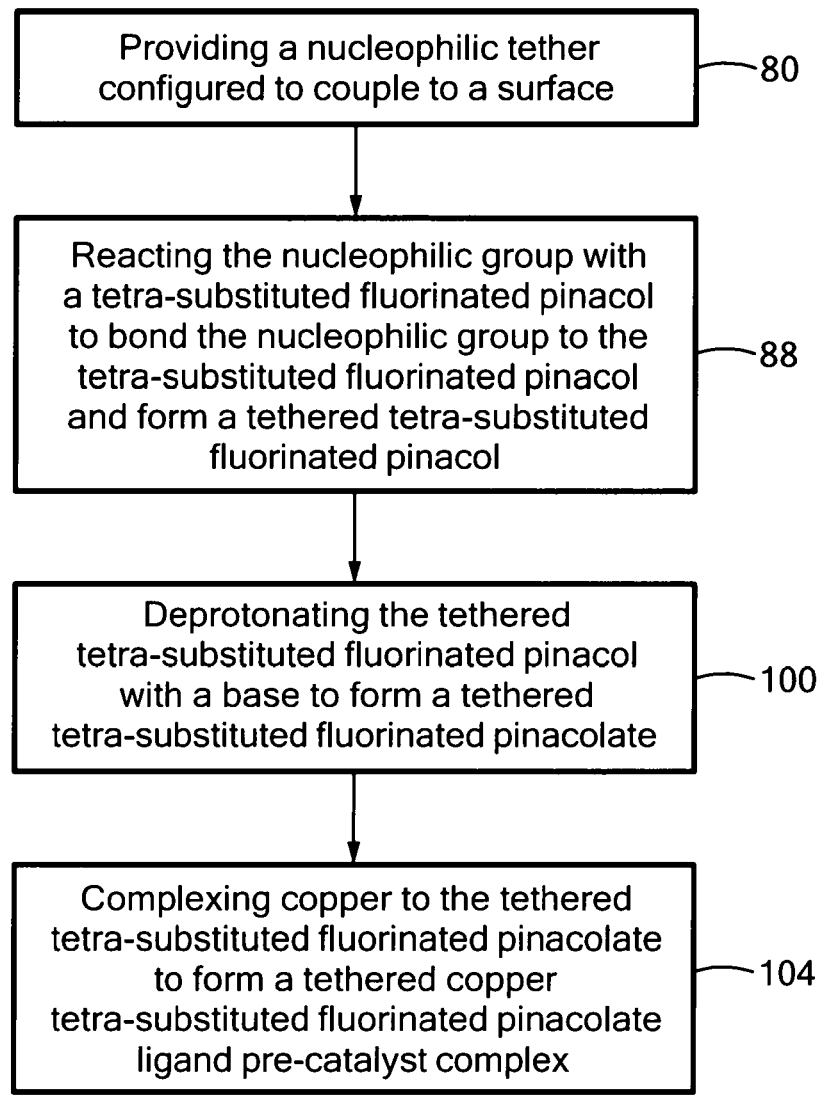
FIG. 14 is a flowchart showing one embodiment of the primary steps of the method for tethering a tetra-substituted fluorinated pinacolate ligand catalyst complex to a surface of this invention.
Figure 15:
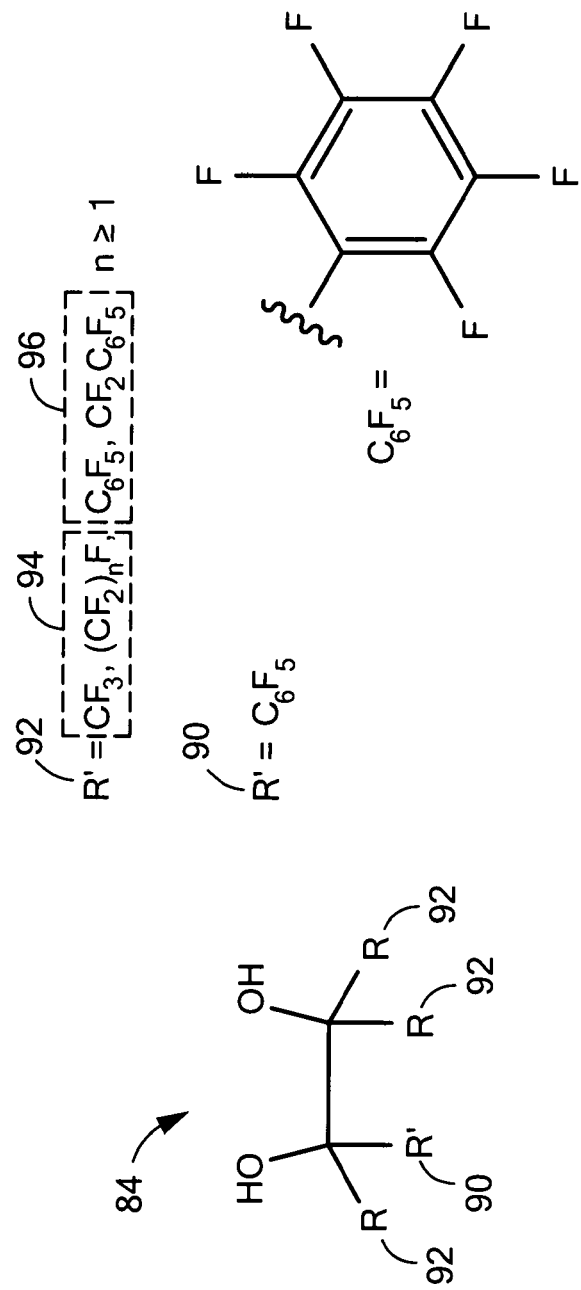
FIG. 15 is a chemical diagram showing one example of the tetra-substituted fluorinated pinacol including at least one fluorinated aryl group and a remainder of groups including fluorinated aryl groups or fluorinated alkyl groups for the method shown in FIG. 14.

FIG. 14 shows one example of the method for tethering a tetra-substituted fluorinated pinacolate ligand to a surface of one embodiment of this invention. The method includes providing a nucleophilic tether configured to couple to a surface, step 80. The nucleophilic tether preferably includes a hydrocarbon linker and a nucleophilic group, e.g., nucleophilic tether 50, FIGS. 9 and 10, with hydrocarbon linker 52 and nucleophilic group 54, as discussed above. Nucleophilic group 54 is then reacted with tetra-substituted fluorinated pinacol 84, FIG. 15, to bond nucleophilic group 54, FIGS. 9 and 10, to tetra-substituted fluorinated pinacol 84 to form tethered tetra-substituted fluorinated pinacol 86, FIG. 16, step 88, FIG. 14. In one example, tetra-substituted fluorinated pinacol 84, FIG. 15, include at least one fluorinated aryl group R'-90, e.g., a pentafluorophenyl ($C_6F_5$) group, and tethered tetra-substituted fluorinated pinacol 86, FIG. 16, include at least one fluorinated aryl group R'-90, e.g., a tetrafluorophenylene, ($C_6F_4$) group. Each of tetra-substituted fluorinated pinacol 84 and tethered substituted fluorinated pinacol 86 include a remainder of groups R-92 including fluorinated alkyl groups 94, e.g. a tri-fluoromethyl ($CF_3$) group or a perfluoroalkyl $(CF_2)_nF$ group, where n≥1 or fluorinated aryl groups 96 e.g., pentafluorophenyl ($C_6F_5$) group or a perfluorobenzyl ($CF_2C_6F_5$) group.

Figure 16:
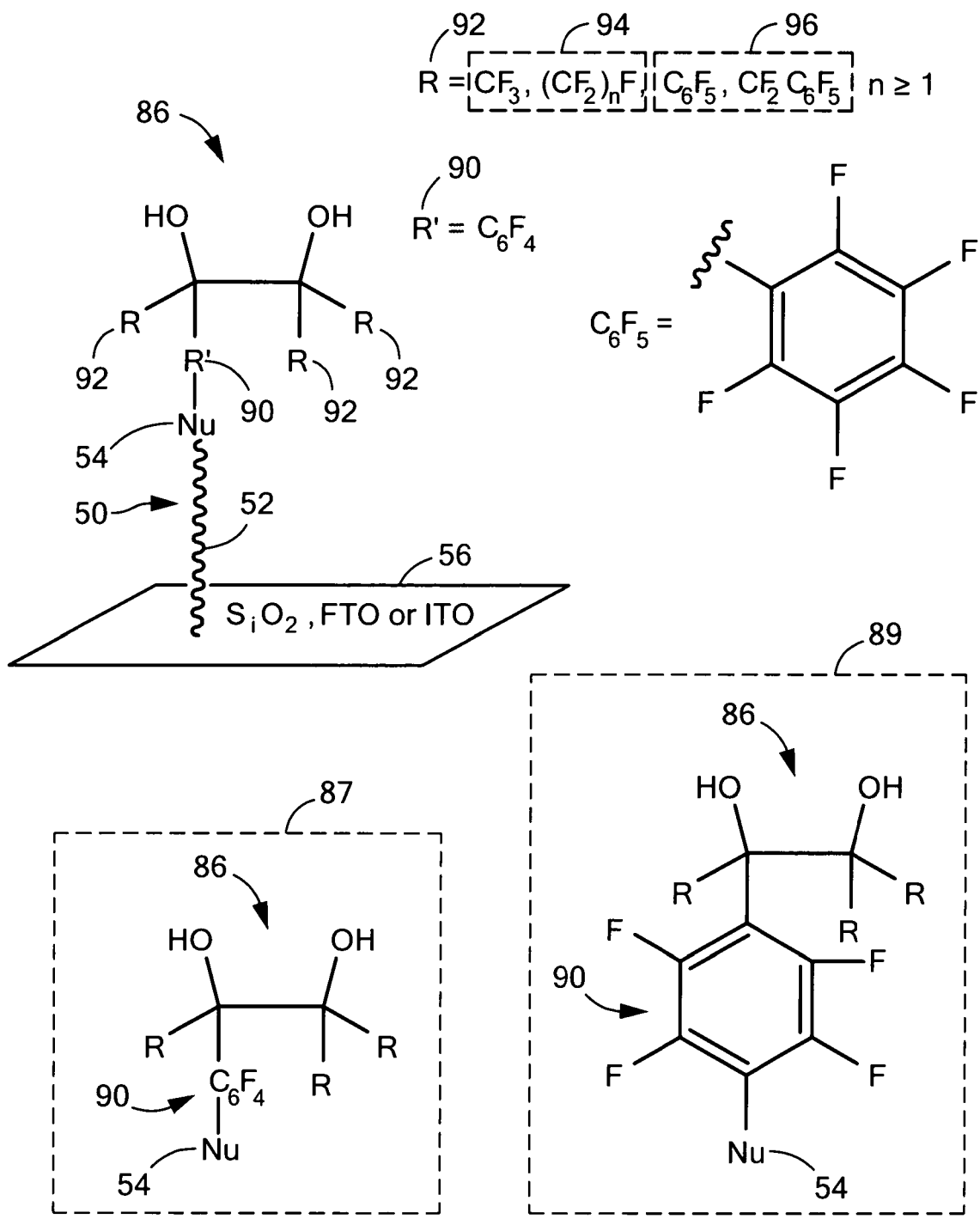
FIG. 16 is a chemical diagram showing one example of a tethered tetra-substituted fluorinated pinacol shown in FIG. 15 including at least one fluorinated aryl group and a remainder of groups including fluorinated aryl groups or fluorinated alkyl groups.
Figure 22:
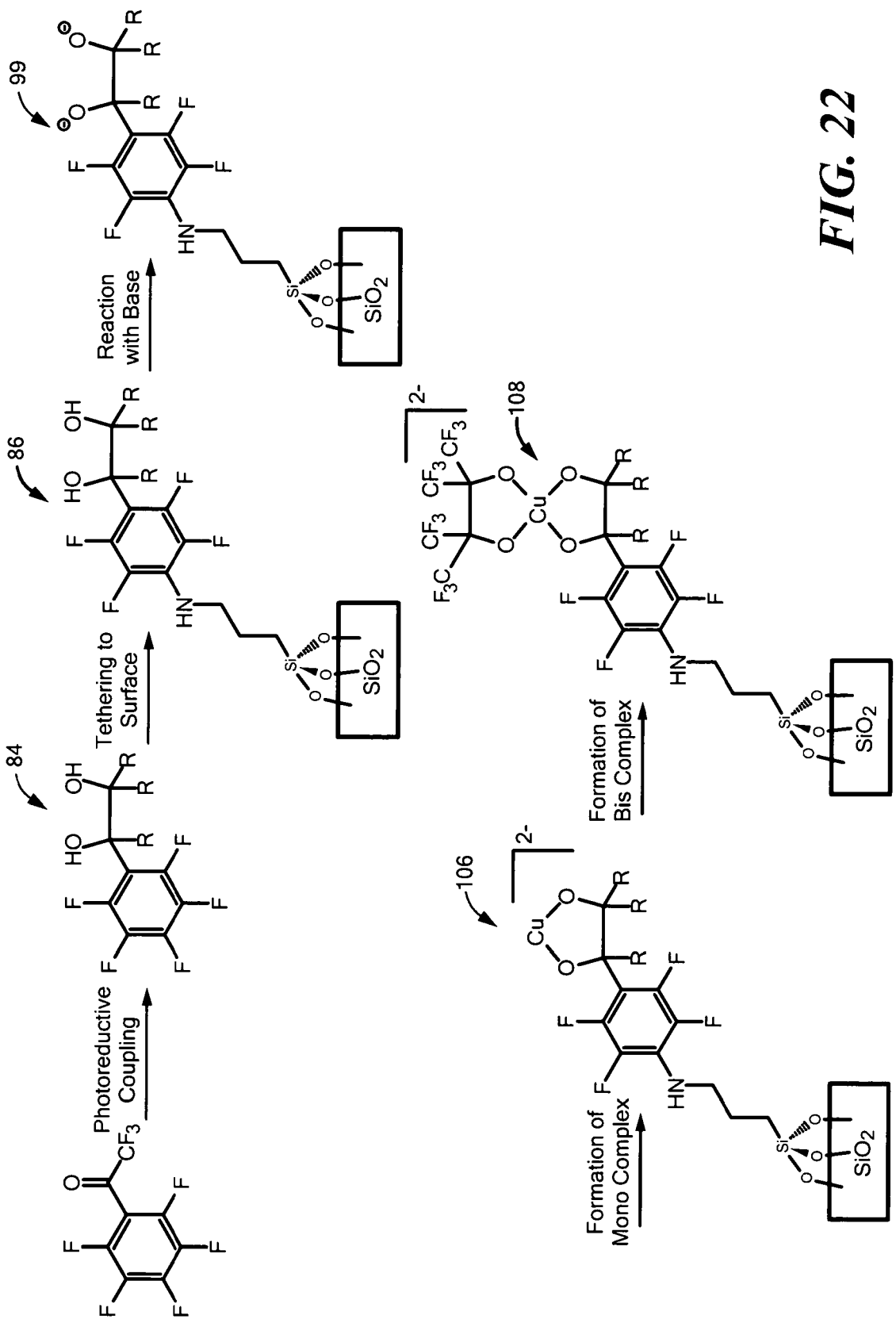
FIG. 22 is a schematic flowchart showing in further detail the primary steps of one embodiment of the method for tethering a tetra-substituted fluorinated pinacolate ligand to a surface shown in one or more of FIGS. 14-21.

Exemplary bonding of nucleophilic group 54, FIG. 16, to fluorinated aryl group R'-90 of tethered tetra-substituted fluorinated pinacol 84 is shown in captions 87 and 89. See also FIG. 22.

Figure 17:
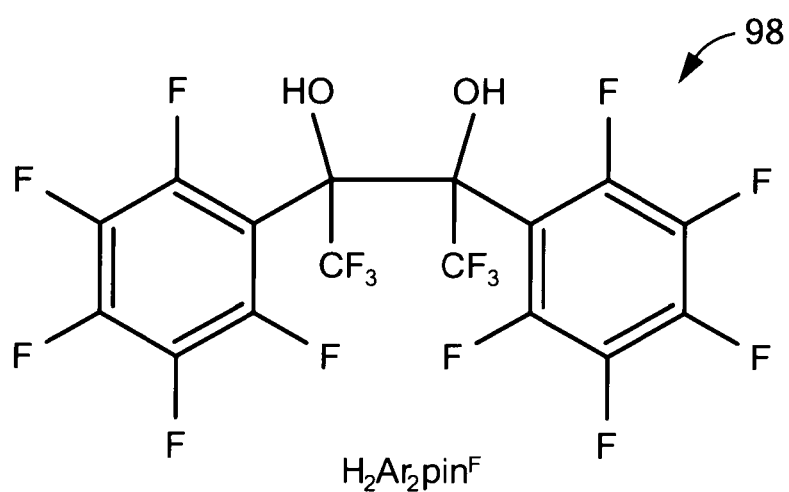
FIG. 17 is a chemical diagram showing one example of the tetra-substituted fluorinated pinacol shown in FIG. 16 configured as di(pentaflurophenyl)di(trifluromethyl)} pinacol.

In one example, tetra-substituted fluorinated pinacol 84 may include di(pentaflurophenyl)di(trifluromethyl)} pinacol-98, FIG. 17.

Figure 18:
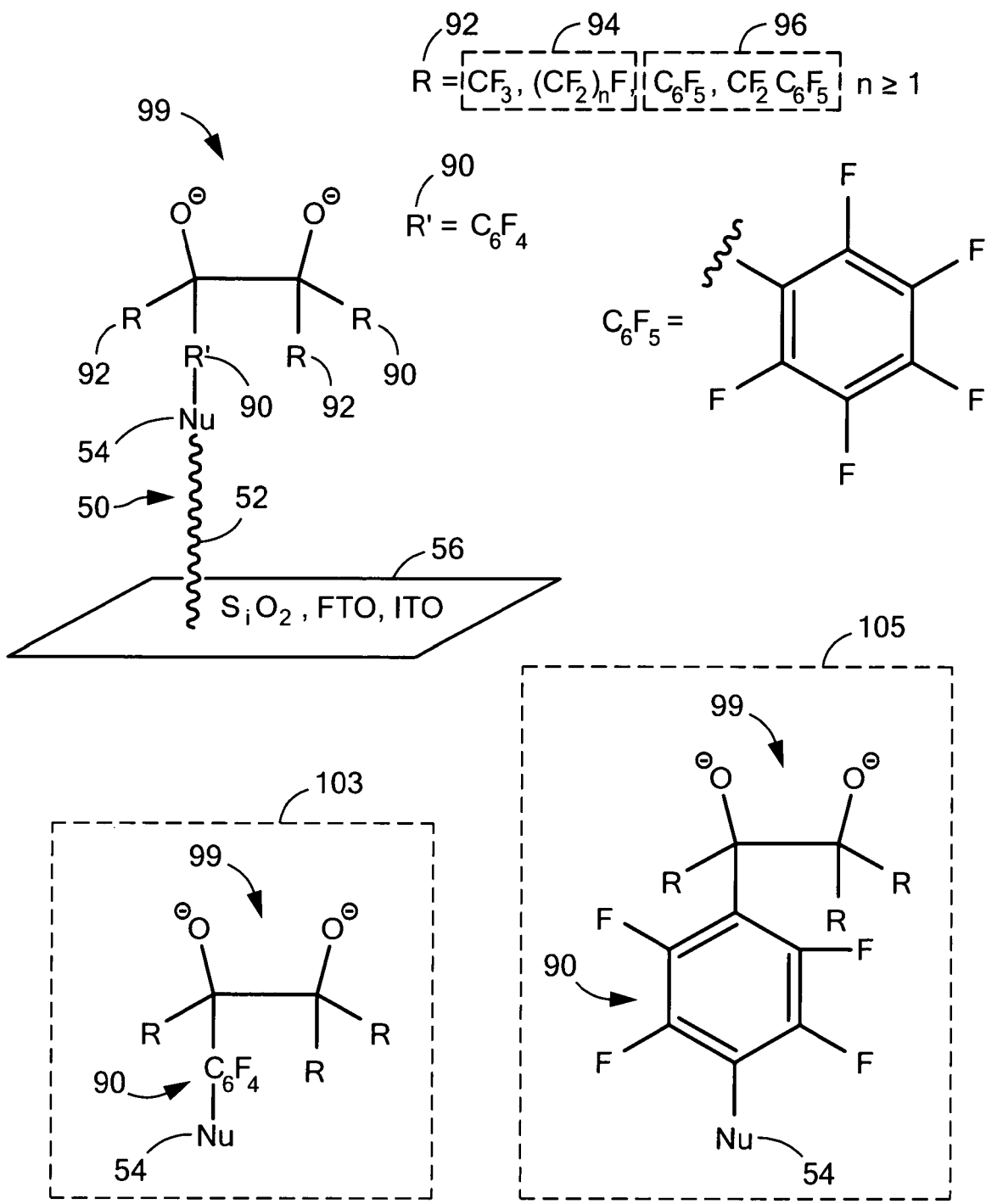
FIG. 18 is a chemical diagram showing one example of a tethered tetra-substituted fluorinated pinacolate including at least one fluorinated aryl group and a remainder of groups including fluorinated aryl groups or fluorinated alkyl groups.

Tethered tetra-substituted fluorinated pinacol 86, FIG. 16, is then deprotonated with a base to form tethered tetra-substituted fluorinated pincolate 99, FIG. 18, step 100, FIG. 14. Exemplary bonding of nucleophilic group 54, FIG. 18, to fluorinated aryl group R'-90 of tethered tetra-substituted fluorinated pinacolate 99 is shown in captions 103 and 105. See also FIG. 22

Figure 19:
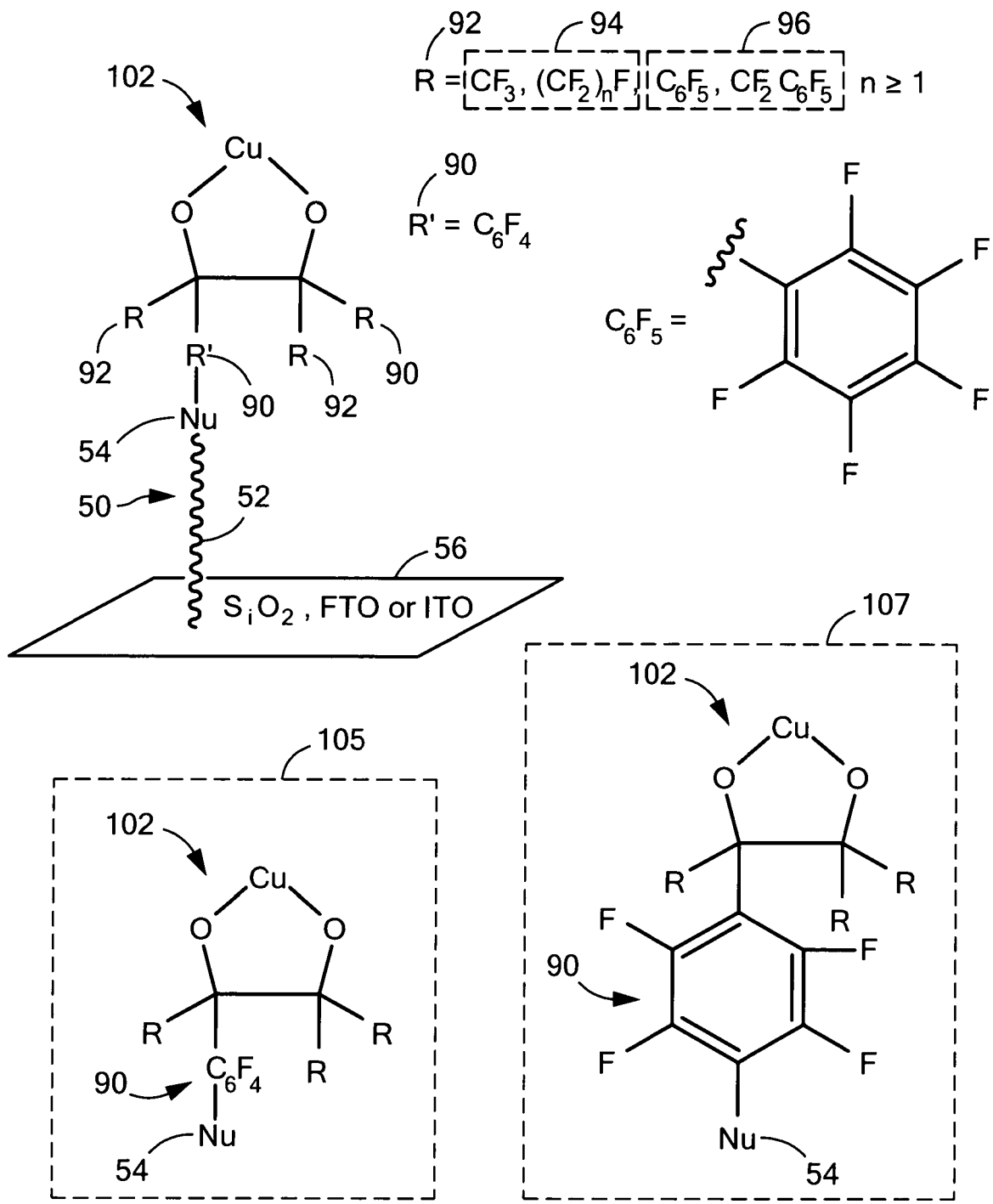
FIG. 19 is a chemical diagram showing one example of a copper(II) tetra-substituted fluorinated pinacolate ligand pre-catalyst complex including at least one fluorinated aryl group and a remainder of groups including fluorinated aryl groups or fluorinated alkyl groups.

Copper (Cu) is then complexed to tethered tetra-substituted fluorinated pincolate 99, FIG. 18, to form tethered copper tetra-substituted fluorinated pincolate ligand pre-catalyst complex 102, FIG. 19, step 104, FIG. 14. In one design, tethered copper tetra-substituted fluorinated pincolate ligand pre-catalyst complex 102, FIG. 18 includes at least one fluorinated aryl group R'-90, e.g., $C_6F_4$ (tetrafluorophenylene) and a remainder of groups R-92 including fluorinated alkyl groups 94, e.g., a tri-fluoromethyl ($CF_3$) group or a perfluoroalkyl $(CF_2)_nF$ group, where n≥1 or fluorinated aryl groups 96, e.g., pentafluorophenyl ($C_6F_5$) group or a perfluorobenzyl ($CF_2C_6F_5$) group. Exemplary bonding of nucleophilic group 54 to fluorinated aryl group R'-90 of copper complexed to tetra-substituted fluorinated pinacolate 102 is shown in captions 105 and 107, similar as discussed above.

Figure 20:
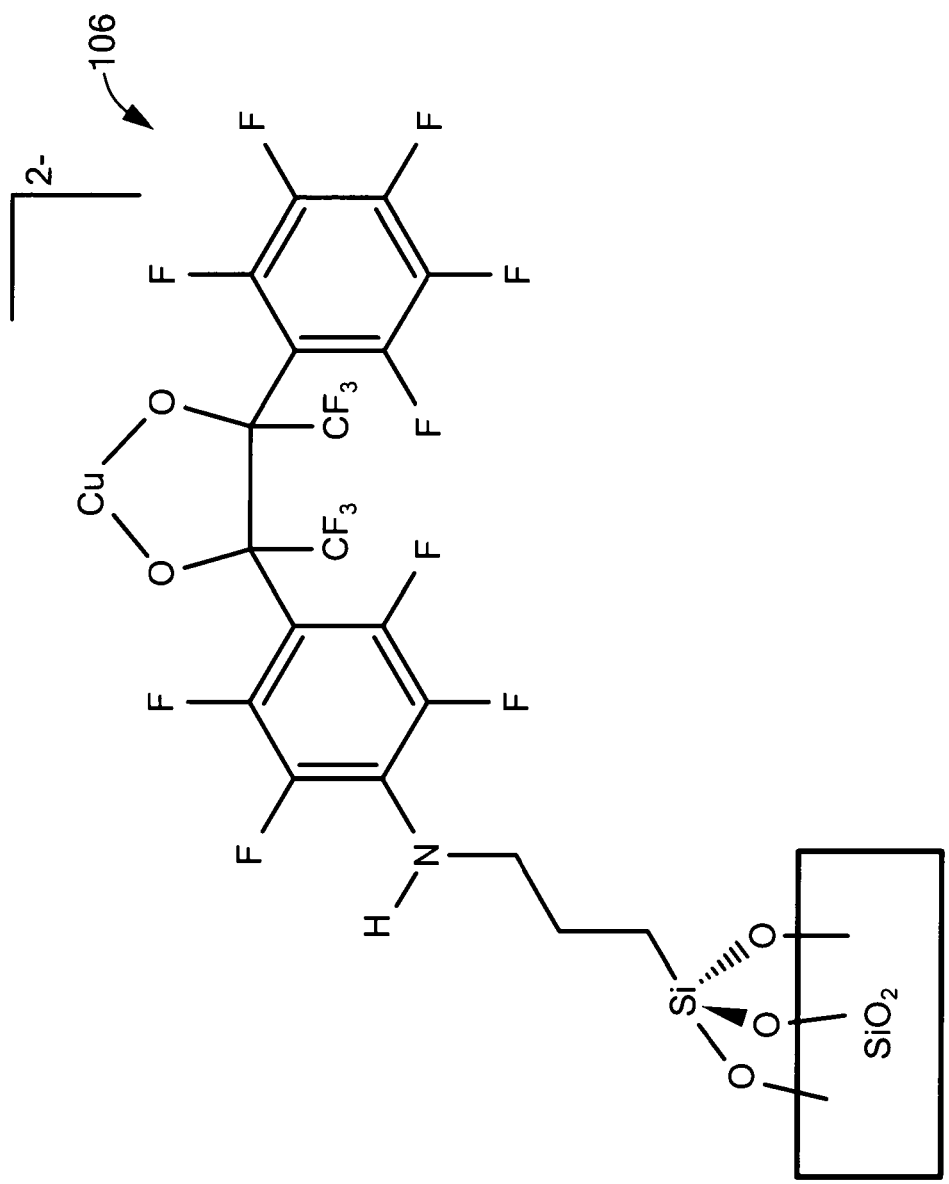
FIG. 20 is a chemical diagram showing of one example of a tethered copper(II) tetra-substituted fluorinated pinacolate ligand pre-catalyst complex configured as mono{di(pentaflurophenyl)di(trifluromethyl)} pinacolate ligand pre-catalyst complex.

In one example, tethered homogeneous copper(II) tetra-substituted fluorinated pinacolate ligand pre-catalyst complex 102, FIG. 19, may be configured as substituted mono{di(pentafluorophenyl)di(trifluromethyl)} pinacolate ligand pre-catalyst complex-106, FIG. 20. See also FIG. 22

Figure 21:
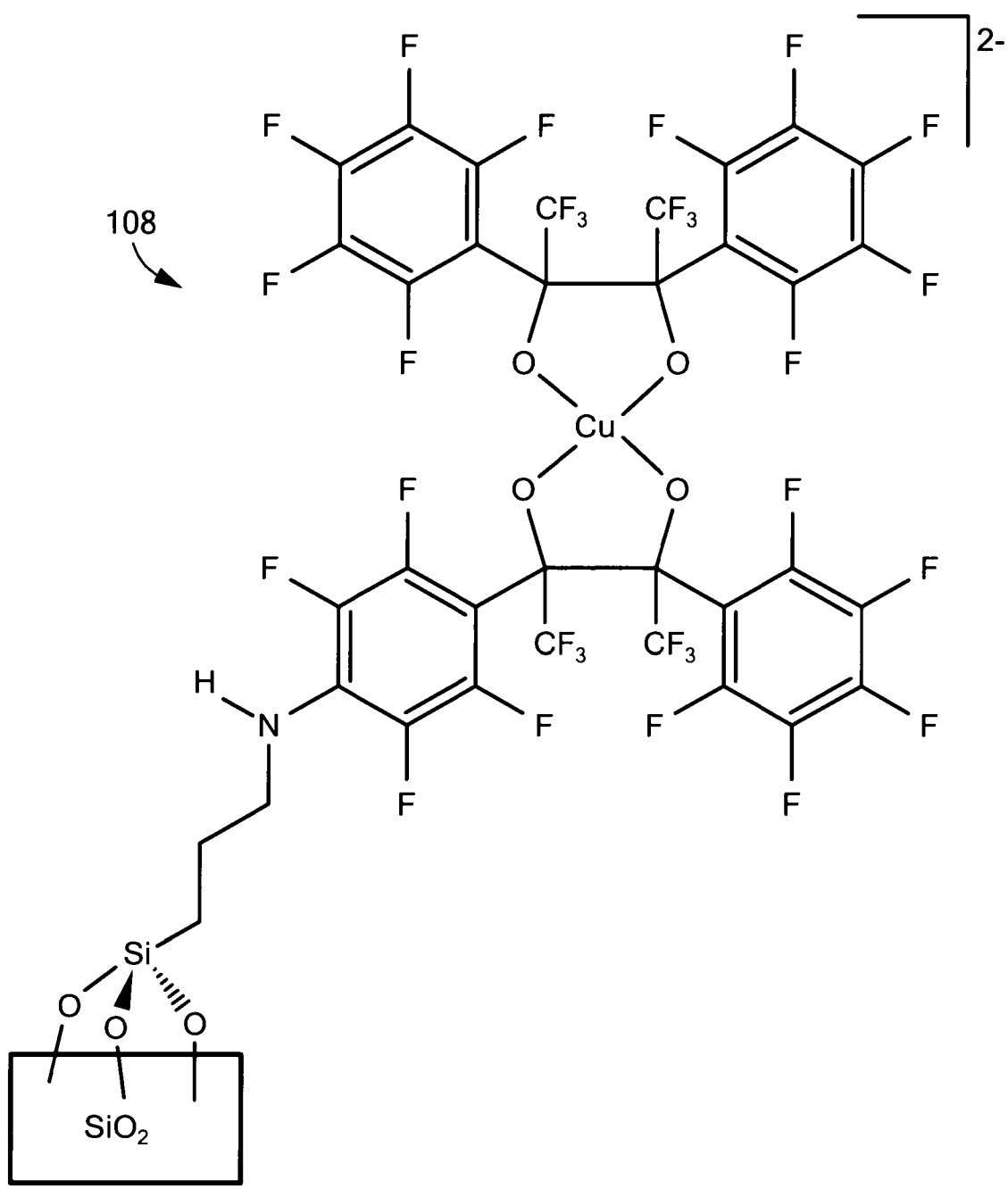
FIG. 21 is a chemical diagram of one example of a tethered copper(II) tetra-substituted fluorinated pinacolate ligand pre-catalyst complex configured as bis{di-pentafluorophenyl di-tri fluromethyl} pinacolate ligand pre-catalyst complex.

In another example, copper(II) tetra-substituted fluorinated pinacolate ligand pre-catalyst complex 102, FIG. 19, may be configured as substituted bis{di-pentaflurophenyl di-tri fluromethyl} pinacolate ligand pre-catalyst complex-108, FIG. 21. See also FIG. 22

Similarly, as discussed above, nucleophilic tether 50 shown in one or more of FIGS. 15, and 17-20 preferably includes alkyl chain 52, FIGS. 8 and 9, with nucleophilic group 54 and surface 56 includes one or more of silicon dioxide ($SiO_2$), fluorinated tin oxide (FTO), or indium doped tin oxide (ITO) as discussed above, FIGS. 8 and 9.

EXAMPLE

Perfluoroacetophenone is dissolved in isopropanol with a few drops of concentrated hydrochloric acid and the solution is stirred for several days while being irradiated with light from a mercury (Hg) lamp to make a yellow solution. Perfluoro(2,3-diphenyl-butane-2,3-diol) is isolated and treated with a stoichiometric amount of potassium hydroxide and copper(II) nitrate trihydrate to make a light blue solid product.

Photoreductive coupling of perfluoroacetophenone: a solution of perfluoroacetophenone (497 mg, 1.88 mmol) in isopropanol (5.0 mL) was treated with a few drops of concentrated hydrochloric acid. The stirred colorless solution was irradiated with a Hg lamp for 4 days, resulting in a clear, pale yellow solution. After concentrating in vacuo, perfluoro(2,3-diphenyl-butane-2,3-diol) was isolated from an orange oil.

Polymerization of 3-aminopropyl triethoxysilane: a solution of 3-aminopropyltriethoxysilane (APTES) (4.73 g, 21.4 mmol) in methanol (20 mL) was treated with a solution of concentrated hydrochloric acid (HCl) (6.75 mL) in methanol (20 mL) and allowed to stir for 3 weeks at room temperature to precipitate poly(APTES) as a white solid (0.959 g).

Tethering of perfluoro(2,3-diphenyl-butane-2,3-diol) to surface: a yellow stirred solution of perfluoro(2,3-diphenyl-butane-2,3-diol) (194 mg, 0.366 mmol) in isopropanol (4.0 mL) is added to a suspension of poly(APTES) in isopropanol and stirred for several days at room temperature to produce tethered-perfluoro(2,3-diphenyl-butane-2,3-diol).

Complexation of perfluoro(2,3-diphenyl-butane-2,3-diol) with copper: a yellow stirred solution of perfluoro(2,3-diphenyl-butane-2,3-diol) (194 mg, 0.366 mmol) in isopropanol (4.0 mL) was treated with a solution of potassium hydroxide (41 mg, 0.73 mmol) in isopropanol. There was no color change but the reaction mixture became cloudy. Water was added until the suspension became a solution. The clear yellow solution was added to a blue stirred solution of copper(II) nitrate trihydrate (44 mg, 0.18 mmol) in isopropanol (2.0 mL). The reaction changed color from a blue solution to a cloudy light blue suspension. After stirring for 1 h, the product was filtered to recover a light blue solid. See FIG. 21.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A method for reducing nitrates, nitrites, and/or hydroxylamine in water using a homogeneous reduced copper tetra-substituted fluorinated pinacolate ligand catalyst complex, the method comprising:
    dissolving a copper(II) tetra-substituted fluorinated pinacolate ligand pre-catalyst complex in water having an excess amount of nitrates, nitrites, and/or hydroxylamine therein;
    subjecting the dissolved copper(II) tetra-substituted fluorinated pinacolate ligand pre catalyst complex in the water to electrochemical reduction to form a homogeneous reduced copper tetra-substituted fluorinated pinacolate ligand catalyst complex; and
    reducing the nitrates, nitrites, and/or hydroxylamine in the water to compounds with nitrogen in a lower oxidation state with the homogeneous reduced copper tetra-substituted fluorinated pinacolate ligand catalyst complex.

2. The method of claim 1 in which the copper(II) tetra-substituted fluorinated pinacolate ligand pre-catalyst complex includes substituents configured as fluorinated aryl groups or fluorinated alkyl groups.

3. The method of claim 1 in which the copper(II) tetra-substituted fluorinated pinacolate ligand pre-catalyst complex includes at least one fluorinated aryl group and a remainder of groups including fluorinated aryl groups or fluorinated alkyl groups.

4. The method of claim 3 further including providing a nucleophilic tether including a hydrocarbon linker and a nucleophilic group configured to couple the homogeneous reduced copper tetra-substituted fluorinated pinacolate ligand catalyst complex copper(II) to a surface with the tetra-substituted fluorinated pinacolate ligand pre-catalyst complex.

5. The method of claim 4 in which the nucleophilic tether includes an alkyl chain with nucleophilic group.

6. The method of claim 5 in which the nucleophilic tether includes a propyl amino group.

7. The method of claim 4 in which the surface includes one or more of: silicon dioxide ($SiO_2$), fluorinated tin oxide (FTO), and indium-doped tin oxide (ITO).

8. The method of claim 3 in which the homogeneous copper(II) tetra-substituted fluorinated pinacolate ligand pre-catalyst complex includes copper(II) mono{di(pentaflurophenyl)di(trifluromethyl)} pinacolate.

9. The method of claim 3 in which the copper(II) tetra-substituted fluorinated pinacolate ligand pre-catalyst complex includes copper(II) bis{di(pentaflurophenyl)di(trifluromethyl)} pinacolate.

10. The method of claim 1 in which the copper(II) tetra-substituted fluorinated pinacolate ligand pre-catalyst complex includes copper(II) bis(perfluoropinacolate).

11. The method of claim 1 further including providing a buffer to control the pH of the water and the homogeneous reduced copper tetra-substituted fluorinated pinacolate ligand catalyst complex to a pH in the range of about 8 to 11.

12. The method of claim 1 in which the electrochemical reduction includes applying an electrical potential between an anode and a cathode placed in the water having the copper(II) tetra-substituted fluorinated pinacolate ligand pre-catalyst complex therein at a potential in the range of about −0.95 V to about −1.20 V.

13. The method of claim 4 in which surface includes the surface of a flow tube configured to receive a flow of the water having an excess amount of the nitrates, nitrites, and/or hydroxylamine.

14. The method of claim 13 in which the homogeneous reduced copper tetra-substituted fluorinated pinacolate ligand catalyst complex including at least one fluorinated aryl coupled to the surface of the flow tube is configured to reduce the nitrates, nitrites, and and/or hydroxylamine in the flow of the water to the compounds with nitrogen in a lower oxidation state.

15. The method of claim 13 in which the homogeneous reduced copper tetra-substituted fluorinated pinacolate ligand catalyst complex including at least one fluorinated aryl coupled to the surface of the flow tube is configured to remove the nitrates, nitrites, and and/or hydroxylamine in the flow of the water to the compounds with nitrogen in a lower oxidation state.

16. The method of claim 14 in which the water having excess nitrates, nitrites, and/or hydroxylamine therein includes water from a municipal water supply.

* * * * *